UNITED STATES PATENT OFFICE.

CHRISTOPHER JAMES, OF SWANSEA, ENGLAND.

PROCESS OF REDUCING ARGENTIFEROUS AND AURIFEROUS COPPER ORES, MATTES, OR COMPOUNDS.

SPECIFICATION forming part of Letters Patent No. 584,783, dated June 22, 1897.

Application filed August 5, 1896. Serial No. 601,784. (No specimens.)

*To all whom it may concern:*

Be it known that I, CHRISTOPHER JAMES, residing at Swansea, South Wales, England, have invented an Improved Process for the Reduction of Argentiferous and Auriferous Copper Ores, Mattes, or Compounds without Loss of the Copper, Silver, or Gold, of which the following is a specification.

This invention relates to the reduction of argentiferous and auriferous copper ores, mattes, and compounds; and it consists of a process of reduction whereby practically no loss beyond that of the usual assay methods is made of either the copper, gold, silver, or lead where present and the product is an argentiferous and auriferous alloy of copper in a condition suitable for further treatment for the production of metallic or refined copper and the collection of the gold and silver by known electrolytical or other means, the lead where present being absorbed in a leady slag, from which it is easily recovered.

It is well known that in all processes at present carried out for the reduction of argentiferous and auriferous copper ores from which "mattes" may be made there is practically little or no loss until the final "roasting" or "bessemerizing" of the concentrated mattes to copper, but so soon as a liquefaction of the matte takes place with a blast or draft of air for oxidizing purposes the lead is entirely volatilized or absorbed by the copper and practically lost as a product, carrying with it considerable silver, and the loss of silver is upward of six per cent. and of copper about two and one-half to five per cent. Now I have found that I can entirely avoid these losses by carrying out the whole reduction by providing in the charge before smelting a sufficiency of oxygen in the form of an oxid distributed uniformly throughout and within the charge to react chemically upon the sulfur or other oxidizable components of the copper charge, and thus entirely avoiding the application of air for oxidizing purposes, as a blast or draft, the oxygen of which is in a gaseous condition. The lead where present is oxidized, and I absorb it in a silicate slag, from which it can be easily recovered. A usual method generally at present followed in the treatment of argentiferous and auriferous sulfureted copper ores is to first concentrate the copper and the precious metals into a regulus or matte of seventy to seventy-five per cent. copper and then to roast or bessemerize the whole of this regulus to metallic copper, and from this copper to separate such gold and silver as are left therein by electrolytical decomposition or otherwise.

Either of the operations of roasting or bessemerizing are extremely expensive and very wasteful of the metals, especially of the silver.

Should lead be present, this has hitherto been found, though not intrinsically of much value, a most troublesome item in the roasting process, partly dissipating and partly alloying with the copper, and in the bessemerizing is volatilized and lost in the flues, increasing the loss of silver.

In carrying out my improved process I avoid both roasting with external air-draft and bessemerizing with air-blast through the molten metal.

I treat part of the ore only to convert it into an oxid or an oxidized form of the metal, or otherwise may add a highly-oxidizing salt to the charge, so as to insure a large percentage of oxygen in a solid form in the charge.

I find it convenient and most suitable in dealing with the sulfureted ores to first concentrate a part of the ore to a regulus of seventy to seventy-five per cent. of copper and then calcine at a low temperature, without liquefaction, the part so concentrated until it is "sweet" or free from sulfur and thoroughly oxidized, or to such other pitch of oxid or of sulfate or of mixed oxids and sulfates as may best suit the conditions of operation. I then mix this calcined regulus or matte with a suitable portion of a raw sulfureted ore in the proportion of about two parts of calcined regulus to one part of raw ore, such as a highly-sulfureted ore containing from thirty per cent. to forty-five per cent. of sulfur, or alternatively I may mix about equal parts of the calcined regulus of seventy-five per cent. copper and of the uncalcined regulus of the same percentage of copper.

I have found that on carrying out the final smelting under the conditions that I add to the mixture in a diffused condition throughout the charge sufficient oxygen in a solid state, either in the form of oxids or oxidized salts, to combine entirely with the sulfur or other oxidizable components in the added part of raw ore or of uncalcined regulus. I obtain all the copper reduced to a metallic state, carrying with it practically all the silver and gold as indicated by original assay of the ore, and thus, as it may be said, without loss.

Where lead is present in the ore and resulting white metal, which is very general up to from two to six per cent., I remove all trouble from this ingredient in obtaining metallic copper free from lead and further free the lead in such a manner that it is readily recovered by mixing after oxidation of the lead, according to the quantity of lead in the charge, an amount of silica which will continue with the lead to form a leady slag. This slag may be skimmed off from the surface of the bath and is very free from silver and contains no gold or copper, while, on the other hand, the argentiferous and auriferous copper products are free from any particle of lead. The silica is added in the proportion of 0.6 per cent. of silica to four per cent. of lead.

The lead is easily recovered from the leady slag by known means.

I submit a probable theory of the wasteful effect of an oxidizing blast as at present used in comparison with the action of my improved process as above described, showing the probable course of the great saving of the copper and precious metals as effected by me, as follows:

In the known roasting process the pigs of metal are exposed to a strong draft of air and heated and gradually melted down, the process lasting from twenty-four to thirty-six hours, and during the whole of this time the reaction of the air on the sulfur of the regulus takes place only on the surface, whether of the pigs or of the melted charge, and myriads of fine granules of regulus and copper, both carrying the precious metals, are blown away from the surface, the action taking place on the surface only. Directly a particle of copper is formed by the regulus being deprived of its sulfur the copper sinks by gravity into the regulus below and is immediately reconverted into regulus, to be again exposed at the surface, and more particles of regulus (and copper) containing silver and gold are blown off. This goes on until the sulfur gets too small to keep all the copper in the state of regulus and copper accumulates on the furnace-bottom, carrying with it in the portions first formed the greater part of the gold, but the silver is still held in the regulus and is still "blown out" by the escaping gases and lost, the amount so lost being very heavy. Some of the precious metals may be caught in the flues, but with all precautions practiced the loss is acknowledged to be serious.

The losses of precious metals in the bessemerizing process are not so well ascertained as yet, but they are admittedly heavier than by roasting, the violent boiling and heavy pressure of air blown through the melted rich regulus carrying off more particles of regulus and copper (containing the precious metals) than even the slower but more prolonged roasting.

In my improved process the action is altogether different. The mixed calcined rich regulus and raw sulfid ore or regulus is filled into a furnace and as the heat increases the surface becomes pasty. At first it parts with sulfur-gas ($SO_2$) and becomes copper. The melting and reaction extends downward and more ($SO_2$) is given off and more copper formed, always in a downward direction, and under the molten portion of copper carried by slag each particle of copper as it forms in a nascent condition eagerly absorbs the adjacent particles of gold and silver and is not further disturbed, because there is no sulfur to spare to the copper when produced, only enough being in the charge to satisfy the oxygen. The reaction between the sulfur and oxygen and the escape of $SO_2$ takes place under the surface, and as the melting proceeds the depth from the surface increases, and the escaping gases passing through the molten surface are deprived of any particles of copper or precious metals by the molten surface through which they pass. The melting of the complete charge of sometimes twenty tons occupies about eight or nine hours and proceeds with a quiet (almost still) working at the surface, yielding almost all the copper contained in the charge containing all the silver and gold and slags poor in copper and rich in oxygen which may be used in the earlier stages. Repeated and exhaustive trials show that practically not the slightest loss of metals takes place, either of copper, silver, or gold.

The copper (containing the precious metals) is now at the stage for tapping or lading into water to form copper "shot" for sulfate-making in which the gold and silver are recovered, or it may be refined and laded into anodes for electrolytical decomposition and the recovery of the gold and silver, the operation costing far less and yielding much more copper than either roasting or bessemerizing. Even a regulus of as low a percentage as fifty per cent. can therefore be worked by my process to advantage.

Having now described my invention, what I claim, and desire to secure by Letters Patent, is—

1. A process for the prevention of the loss of the precious metals in the reduction of sulfureted argentiferous and auriferous copper ores containing lead consisting of the concentration of part of the ore to a regulus of seventy to seventy-five per cent. and the calcination of the same at a low temperature, the mixture of raw ore or uncalcined regulus with the calcined regulus, then smelting the mixture, adding to the smelting charge a sufficient amount of silica to absorb the oxidized lead into a leady slag, free from the precious metals, and with little copper and the recovery of the lead from the leady slag, substantially as described.

2. A process for the prevention of the loss of the precious metals in the reduction of sulfureted argentiferous and auriferous copper ores containing lead consisting of the concentration of part of the ore to a regulus of seventy to seventy-five per cent. and the calcination of the same at a low temperature, the mixture of raw ore or uncalcined regulus with the calcined regulus, then smelting the mixture adding to the smelting charge a sufficient amount of silica to absorb the oxidized lead into a leady slag, free from the precious metals, and with little copper, the recovery of the lead from the leady slag and the addition of the highly-oxidized slag free from lead to the ore in the early stages of concentration, substantially as described.

In testimony whereof I have signed my name to this specification in the presence of two subscribing witnesses.

CHRISTOPHER JAMES.

Witnesses:
WILLIAM TERRILL,
ARTHUR SPERRY.